United States Patent [19]

Bodine

[11] Patent Number: 4,703,207

[45] Date of Patent: Oct. 27, 1987

[54] ALTERNATING CURRENT MAGNETO HYDRODYNAMIC GENERATOR

[76] Inventor: Albert G. Bodine, 7877 Woodley Ave., Van Nuys, Calif. 91406

[21] Appl. No.: 758,763

[22] Filed: Jul. 25, 1985

[51] Int. Cl.$^4$ ............................................ H02K 44/00
[52] U.S. Cl. ..................................................... 310/11
[58] Field of Search ........................................ 310/11

[56] References Cited

U.S. PATENT DOCUMENTS

| | | | |
|---|---|---|---|
| 2,731,795 | 1/1956 | Bodine | 310/11 X |
| 3,138,919 | 6/1964 | Deutsch | 310/11 X |
| 3,185,871 | 5/1965 | Bodine | 310/11 |
| 3,243,713 | 3/1966 | Brahm | 310/116 |
| 3,258,685 | 6/1966 | Horton | 310/11 X |
| 3,286,108 | 11/1966 | Fonda-Bonardi | 310/11 |
| 3,350,584 | 10/1967 | Brocher et al. | 310/11 |
| 3,418,206 | 12/1968 | Hall | 310/11 X |
| 3,622,817 | 11/1971 | Isaacson | 310/11 |
| 4,134,034 | 1/1979 | Dardai | 310/11 |

Primary Examiner—Donovan F. Duggan
Attorney, Agent, or Firm—Edward A. Sokolski

[57] ABSTRACT

A pair of resonant combustion chambers are interconnected by means of a narrow channel. Magnetic pole pieces are positioned in opposing relationship on opposite sides of the channel to establish a magnetic flux across said channel. Fuel is fed to the combustion chambers and ignited alternately by resonant detonation, first in one chamber and then the other to generate combustion gases to develop an ionized body of gas or plasma in the chambers. Shock waves are formed in the chambers with lumped constant resonant acoustic vibration of the plasma being established in each of the chambers. With the detonation in each chamber, the shock wave developed causes a cohesive mass or "slug" of gas to be propelled from the fired chamber through the interconnecting narrow channel surrounded by the pole pieces into the non-fired chamber. On the next half cycle, a slug of gas is propelled from the second chamber to the first in like manner, thereby resulting in an oscillatory shock wave of gas to be propelled between the pole pieces, first in one direction and then the other. The oscillatory propulsion of the ionized gas between the pole pieces results in the generation of an alternating electric current which is taken as an electrical output from the plasma by means of suitable electrodes.

6 Claims, 4 Drawing Figures

ALTERNATING CURRENT MAGNETO HYDRODYNAMIC GENERATOR

This invention relates to an alternating current magnetohydrodynamic generator, and more particularly, to such a device employing a pair of acoustically resonant combustion chambers which are interconnected or coupled by a narrow channel in which an alternating current output is developed.

In my U.S. Pat. No. 3,185,871, issued May 25, 1965, an alternating current magnetohydrodynamic generator is described, which employs paired tube-shaped organ pipe resonators with combustion chambers which are ignited alternately to provide an alternating flow of ionized gas or plasma, first in one direction and then the other past a pair of pole pieces to generate an alternating current. In its basic operation, the device of the present invention is similar to that of my prior patent and the teachings thereof are incorporated herein by reference and will be referred to from time to time to supplement the disclosure of the present application.

The system of the present invention provides a substantial improvement over that of my prior patent in the following respects. In the system of my prior patent, the pipe resonators and combustion chambers, along with the interconnecting plasma duct are in the nature of an organ pipe. In this environment, the plasma assumes a velocity pattern of a standing soundwave along the "organ pipe" such that the velocity is not uniform but varies over the standing wave between a peak velocity at the antinodes and minimum velocity at the nodes. As a result, adjacent cross paths in the plasma's velocity pattern will have different velocities. This results in a rather irregular voltage output among the pickup electrodes. Moreover, the organ pipe configuration has high harmonic content which has shortcomings in that it must be heavily filtered to provide the desired sine wave output. The system of the present invention overcomes these shortcomings by employing a pair of lumped constant acoustic combustion chambers which form Helmholtz resonators. These two Helmoholtz resonators are coupled together by a short, narrow neck-like channel at which the magnetic pole pieces are located to develop the electricl output current. The plasma drive is developed in alternate fashion successively in each of the chambers, as in the system of my prior patent. However, in view of the nature of the chambers and the short interconnecting channel, the plasma is driven in a uniformly moving localized mass as a "slug" of gas, first in one direction and then the other through the short and narrow channel between the two chambers. With the highly concentrated plasma mass moving between the pole pieces, a high level output can be generated between the output electrodes with a minimum tendency to develop spurious currents which would contribute to harmonics in the output. Thus, with the system of the present invention, it is possible to generate a substantially higher level output having significantly less harmonic content than with the system of my prior patent.

As mentioned in my prior patent, to increase the ionization of the plasma, it may be desirable to seed the combustion gases with substances such as potasium powder. It has been found, however, that certain fuel such as certain types of regular grade gasoline may have impurities which contribute to ionization and more importantly, that the shock waves developed in the closely adjacent combustion chambers apparently enhance ionization. The development of shock waves in the system of the present invention is highly significant, not only in view of the ionization which it produces, but also in its effect in uniformly propelling the gas in a high speed unitary mass between the chambers through the interconnecting electrical current pick-off channel.

It is therefore an object of this invention to provide an improved alternating current magnetohydrodynamic generator having substantially higher output with less harmonic content than similar systems of the prior art.

It is a further object of this invention to provide an improved alternating current magnetohydrodynamic generator employing Helmholtz resonators as the combustion chambers, these resonators being interconnected by a narrow short channel where the electrical output is generated.

It is still a further object of this invention to provide an alternating current magnetohydrodynamic generator wherein the plasma is developed in a pair of closely adjacent combustion chambers and propelled between the chambers in a uniform consolidated mass.

Other objects of this invention will become apparent as the description proceeds in connection with the accompanying drawings of which:

Figure 1:
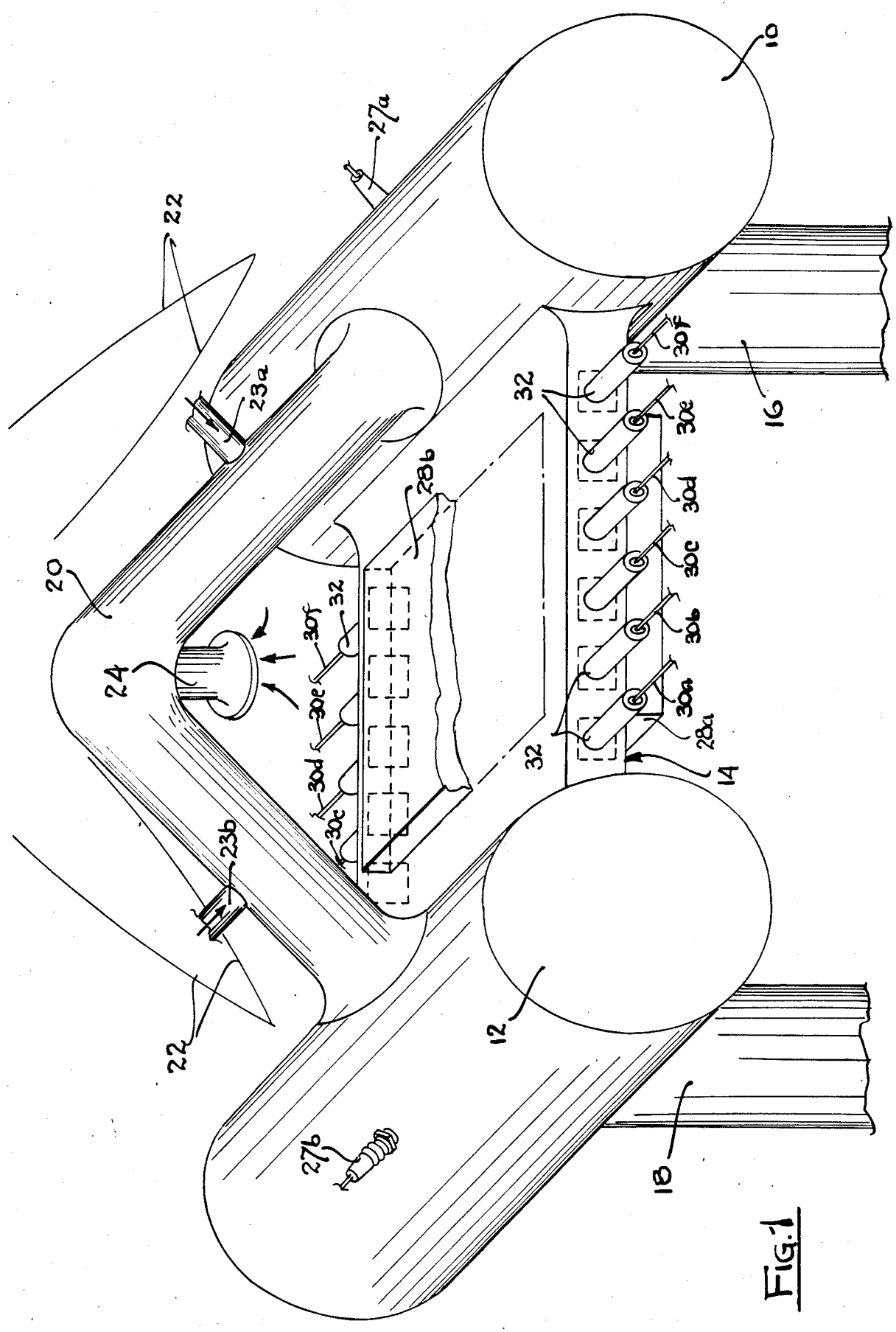
FIG. 1 is a perspective view of a preferred embodiment of the invention.
Figure 2:
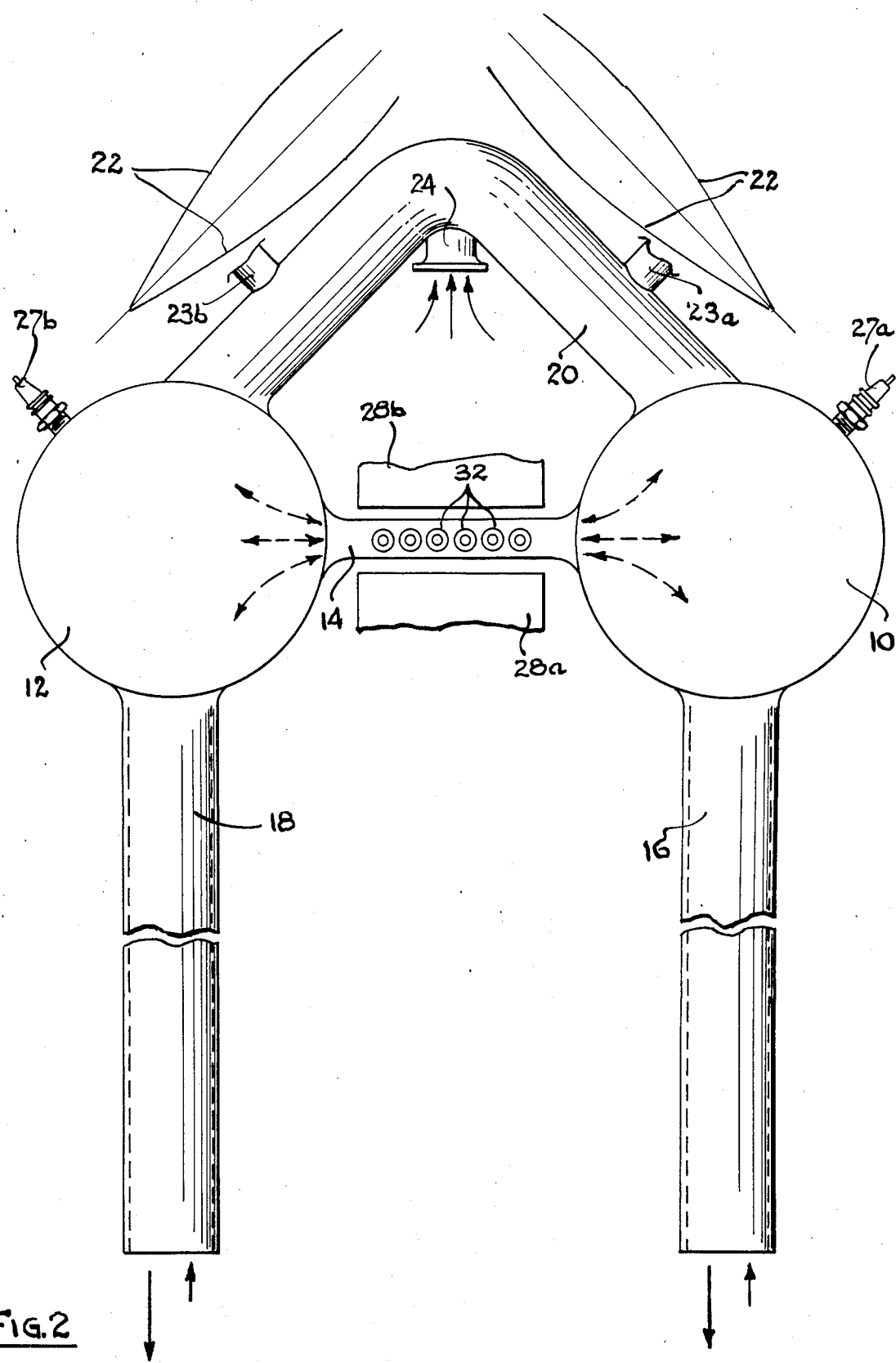
FIG. 2 is an end elevational view of the preferred embodiment.
Figure 3:
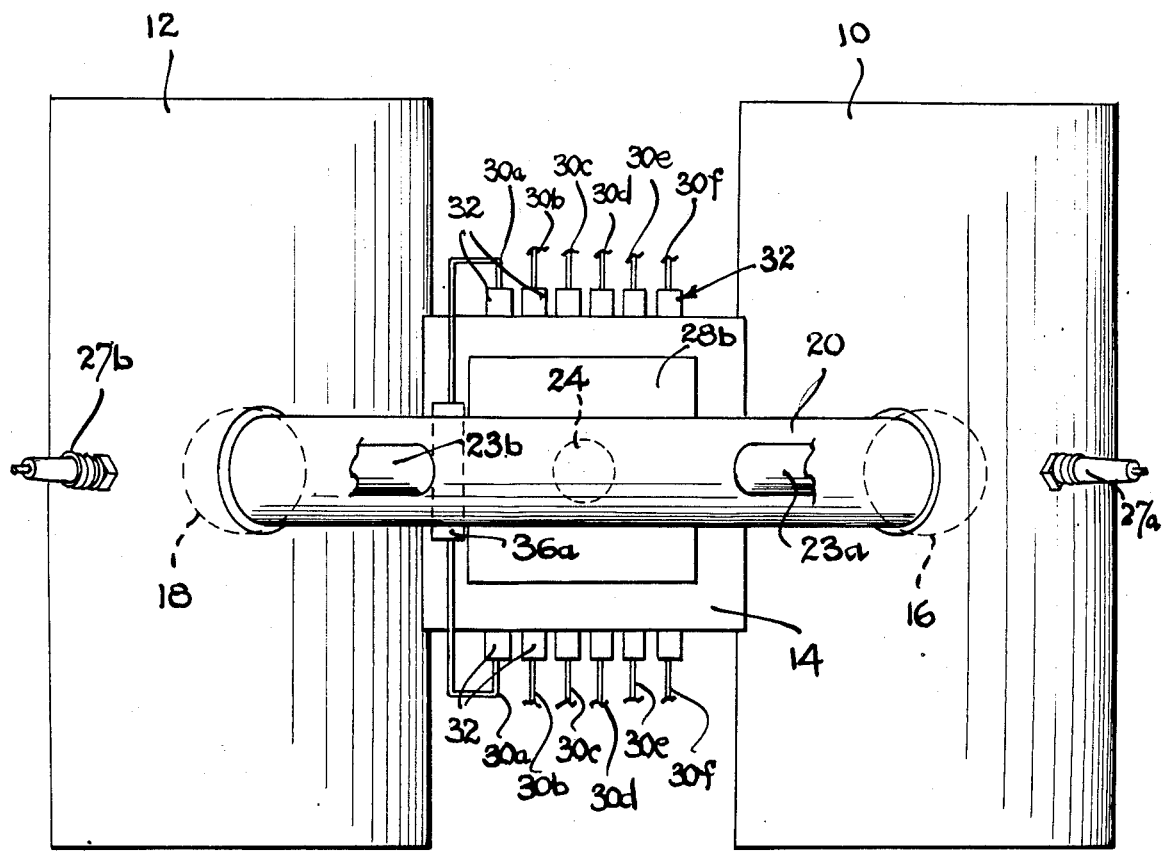
FIG. 3 is a top plan view of the preferred embodiment.
Figure 4:
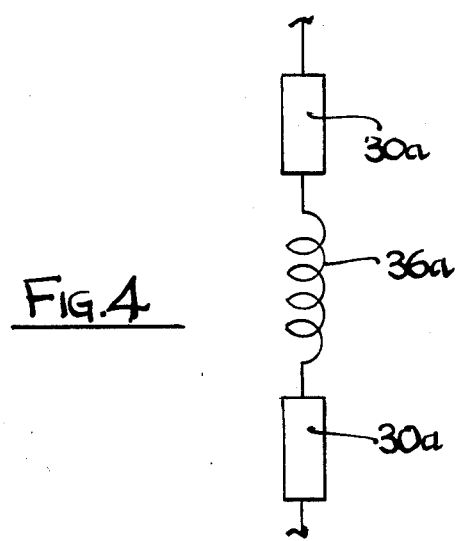
FIG. 4 is a schematic drawing showing the electrical connections for the electrodes and pick-off transformer employed.

Referring to the figures, a pair of cyclindrical combustion chambers 10 and 12 form Helmholtz resonators and are interconnected by a short narrow channel or duct 14 which forms a neck between the two chambers. The chambers and the interconnecting neck portion may be integrally formed of a unitary casting of a high temperature material such as a suitable ceramic. Chambers 10 and 12 are further interconnected by "V"-shaped intake pipe 20. The air is sucked into intake pipe 20 through air inlet 24 by the centrifugal pumping effect engendered by the radius of the "V", and fuel is introduced into each of the legs of the intake pipe through fuel inlet ducts 23a and 23b which provide fuel for combustion chambers 10 and 12 respectively. Spark plugs 27a and 27b are provided for chambers 10 and 12 respectively to initially ignite the fuel mixture therein; they can be turned off after resonant operation is established. A pair of magnetic pole pieces 28a and 28b are positioned on opposite sides of neck portion 14 to provide magnetic flux through this neck portion. A plurality of paired electrodes 30a–30f are installed in opposite sides neck portion 14. These electrodes are made of a durable material such as platinum and pass through insulators 32 which are fixedly attached tot he walls of neck portion 14 into the interior of the duct. Each of paired electrodes 30a–30f is connected to an opposite side of an associated primary winding 36a–36f of an associated transformer (only one shown in FIGS. 3 and 4).

Combustion chambers 10 and 12 fire automatically in 180 degree phase relationship by virtue of the resonant pressure surges which periodically detonate the fuel air mixtures in the two chambers in synchronous fashion. The fuel may be a regular grade gasoline and may be seeded with a substance such as potassium powder to enhance the ion content of the combustion gas generated. As already noted, combustion chambers 10 and 12 form Helmholtz resonators with the combustion gases generated therein; the cavities acting in the nature of springs in the mechanical vibrating circuit and the combustion gases in neck 14 and in the chambers providing the mass for the acoustic resonance. The operation of such a resonant circuit is described on pages 325 and 326 of Sonics by Hueter & Bolt, published by John Wylie & Sons, Inc. (1955). As noted in this text, the volume of each of the chambers represents a compliance, "$C_m$" which cn be analogized to the capacitance of an electrical circuit while the gas moving in and out of each chamber represents a mass M which is analogous to electrical inductance L, and the damping, $R_m$ can be analogized to electrical resistance, R. The acoustical impedance Z of a Helmholtz resonator is as follows:

$$Z = R_m + j(\omega M - 1/\omega C_m) \quad (1)$$

In this equation, $\omega = 2\pi f$, where f is the resonant frequency and $R_m$ represents the damping due somewhat to sound radiation from the resonator and particularly to the magnetohydrodynamic conversion in neck 14. At a resonant frequency, the reactances $\omega M$ and $1/\omega C_m$ cancel each other out, leaving only the damping, $R_m$ as the impendance in the circuit. With such minimum impedance at resonance, high amplitude oscillatory vibration is obtained in the neck 14. This is particularly so when the quality factor "Q" of the resonator is high; this condition being achieved with low damping, $R_m$ and/or high mass, M, quality factor being defined as follows:

$$Q = \omega M / R_m \quad (2)$$

It is to be noted that a detonation shock wave is generated with the detonation explosion in each of chambers 10 and 12. These shock waves alternately impel a unitary mass of ionized gas from chamber 10 through neck portion 14 to chamber 12 and on the alternate half cycle, from chamber 12 through the neck portion to chamber 10. The shock waves tend to enhance the ionization of the gases and also result in a high speed shock flow of the mass of gases through neck portion 14 between the pole pieces which markedly enhances the electrical output of the device. It is also to be noted that the construction of neck portion 14 so that it is relatively flat enables the close spacing between pole pieces 28a and 28b, thereby maximizing the effect of the flux in the neck portion.

Because of this connecting Helmholtz neck 14 the two chambers must necessarily fire or explode 180 degrees out of phase with each other. There is thus periodically a large absolute pressure gradient for supersonic conditions between the two chambers as felt by the gas in the short neck 14. Therefore, strong shock waves occur within the fluid dynamics in the neck, which aids the ionization of the gas slug in the neck.

In order to minimize the dissipation of energy in intake pipe 20, the lengths of the legs of this pipe are chosen so that they are each a quarter wavelength at the resonant frequency of the Helmholtz resonators formed by chambers 10 and 12. Thus, standing wave patterns as indicated by graph lines 22 are set up the two legs of pipe 20 with a low impedance appearing in the turn radius where the pipe is coupled to the ambient atmosphere and a high impedance at the interface between the pipe and the two combustion chambers. This presents a high impedance to the acoustical energy generated in the combustion chambers which minimizes the dissipation of such energy in the intake pipe.

Except as specifically noted herein, the operation of the generator of the present invention is similar to that described in my aforementioned U.S. Pat. No. 3,185,871.

While my invention has been described and illustrated in detail, it is to be clearly understood that this is intended by way of illustration and example only and is not to be taken by way of limitation, this spirit and scope of this invention being limited only by the terms of the following claims:

I claim:

1. A magnetohydrodynamic alternating current generator comprising a coupled pair of combustion chambers:
   means for providing an intake of a combustion mixture to each of said chambers;
   means for providing an exhaust for each of said chambers;
   said chamber being acoustically coupled for alternately igniting the fuel mixture in each of said chambers in 180 degree phase relationship;
   a narrow neck portion forming a channel for carrying gas between said chambers;
   pole piece means positioned alongside said channel for providing magnetic flux across the channel, and
   means for picking off an alternating electric current from said channel, said current being generated by virtue of the alternate propulsion of unitary masses of ionized gas through said channel between said chambers successively in opposite directions.

2. The device of claim 1 wherein said neck portion is a flat sided, relatively short channel, said pole pieces means comprising a pair of pole pieces positioned in opposing relationship on opposite sides of said channel.

3. The device of claim 1 wherein said means for providing an intake of a combustion mixture to said chambers comprises a V-shaped pipe connected at opposite ends to each of said chambers and having fuel intakes for each of said chambers and an air intake for both of said chambers.

4. The system of claim 3 wherein said V-shaped pipe has a pair of legs each of which legs has a length equal to a quarter wavelength at the acoustical resonant frequency of said chambers.

5. The system of claim 1 wherein said means for picking off an alternating current from said interconnecting channel comprising a plurality of electrodes installed in said channel in pairs positioned on opposite sides of said channel, a transformer winding being connected between each of said pairs of electrodes.

6. A method for generating an alternating current magnetohydrodynamically comprising:
   providing a pair of combustion chambers forming Helmholtz resonators;
   interconnecting said chambers by a relatively short channel in the form of a narrow neck;
   providing magnetic flux across said channel;
   providing a combustion mixture to each of sid chambers and;
   resonating said chambers as coupled Helmholtz cavities for alternately firing the combustion mixture in each of said chambers in 180 degree phase relationship to form resonant shock waves of ionized combustion gas in said chambers, said ionized gas being propelled in a uniform cohesive mass through said channel, first in one direction between the chambers, and then in an opposite direction between the chambers.

* * * * *